United States Patent Office 3,734,760
Patented May 22, 1973

3,734,760
PROCESS FOR THE PRODUCTION OF
AMYLOSE FILMS
Hiromi Hijiya and Mikihiko Yoshida, Okayama, Japan, assignors to Hayashibara Company, Okayama-shi, Okayama, Japan
No Drawing. Filed July 27, 1971, Ser. No. 166,640
Claims priority, application Japan, July 28, 1970, 45/66,004
Int. Cl. C08b 25/02
U.S. Cl. 106—210
8 Claims

ABSTRACT OF THE DISCLOSURE

The production of transparent, stable and strong amylose films comprising hydrolysis of a gelatinized solution of amylomaize starch or ordinary starch with the action of alpha-1,6-glucosidase, precipitating by cooling the reaction mixture, recovering the formed starch precipitates which consist exclusively of amylose molecules, adding to the resultant plasticizer in which a maltitol with a purity of over 50% is present or a plasticizer in which a mixture of said maltitol product and another plasticizer is present, and forming amylose films with said mixture of amylose and plasticizers.

The present invention relates to a process for the production of amylose films with improved transparency and strength properties and which are not effected by changes due to prolonged storage, which comprises gelatination of amylomaize starch or ordinary starch by heating, hydrolysis of the gelatinized starch solution with the action of alpha-1,6-glucosidase, thus converting the gelatinized solution completely into a mixture of linear-chain-molecular-amylose, precipitation of macromolecular amylose, admixing to the precipitated macromolecular-portion used as starting material a mixture of hydrogenated-starch-sugar, in which over 50% of maltitol is present, with or without at least one compound selected from a group comprising polyalcohol, aminoalcohol and alkylamine chloride, and using the mixture as a plasticizer.

Much literature on the production of amylose films is found in patents and reports. According to the prior art processes, starch which contains a large portion of natural amylose, i.e. amylomaize starch, which possesses an amylose content of about 50%-80%, or amylose fractionated from potato starches and other varieties of starches are used as starting material. Amylose films are formed either by neutralizing and coagulating an alkali solution of said amylose in a sulfuric acid bath or alternatively by forming films with a heated aqueous solution of said amylose. Polyalcohols, e.g. glycerol and sorbitol, aminoalcohol, alkylammonium chloride, etc., or mixtures thereof are used as moisture-content-controller or as plasticizer in the processes.

The amylose films formed according to the processes are disadvantageous in the following points: brittleness, lack of flexibility (elasticity), requirement of a large amount of humectant, great changes in properties with the elapse of time due to the retrogradation characteristic of amylose, that the films become brittle with elapse of about three to four weeks, that the films are greatly effected by atmospheric humidity due to their high hygroscopicities, that the films are generally weak in strength. However, since the films possess low oxygen permeability, degestibility and edibility, amylose films are received with great attention.

With the purpose to overcome these disadvantages, the inventors studied the use of an amylose which consisted exclusively of linear-chain-molecules and which was obtained by debranching the amylopectin present in gelatinized starch solutions with the utilization of the actions of alpha-1,6-glucosidase, instead of using as starting material amyloses in which some of amylopectin is present as in the previous arts. The studies resulted in the discovery of a process characterized in that the process is effective in the prevention of changes with the elapse of time, in rendering to the films formed with said material satisfactory flexibilities, which are not effected to changes with the elapse of time and in inhibiting the hygroscopicities of the films. In other words the inventors discovered an effective process for the production of amylose and for the formation of films therefrom, to which higher tensile strengths and elasticities and other improved properties may be rendered as compared with the conventional amylose films. According to the process, hydrogenated oligosaccharides, in which maltitol is their main ingredients, or if necessary furtherly other polyalcohols, amines, or quarternary alkylammonium salts, etc., are added to the amylose, which is produced as described above and which consists exclusively of linear-chain molecules.

The starting material amyloses which may be employed in the invention are amylomaize starch which possesses an amylose content of 50%-80% and an amylopectin content of 50%-20%, and an amylose (in which an amylopectin content of about 19% is present) which is obtained by the fractionation of ordinary starches. Each of these starches contains branched-chain amylopectin, which is a favorable but harmful ingredient for amylose films; lowering the tensile strengths and folding endurancy of the film products, and also lowering film formabiilty. In the invention the branched structures of amylopectin are debranched with the employment of a pullulanase produced by *Aerobacter aerogenes* ATCC 8724 or an isoamylase produced by *Pseudomonas amyloderamosa* ATCC 21262. Thus a starch, all of the components of which are converted into linear-chain molecules, is used as starting material. Therefore the starting material and the films formed therewith are entirely different to those of conventional types and stronger films are obtainable. For industrial practice an amylose obtained in accordance with one of the following processes is employed for film formation in the invention: (1) A suspension of amylomaize starch, which contains 50%-70% of amylose, is gelatinized at over 120° C., subjected to the action of the pullulanase or the isoamylase, both described above, and then the amylose is separated by precipitation, and hereinafter referred to as AME. (2) An ordinary starch suspension is gelatinized and similarly debranched as described in (1) and the portion which precipitates at 40° C.–50° C., i.e. the portion which contains more than 50% of long-chain amylose, referred to as AL hereinafter. is separated.

Film formation is attainable by forming films with an alkali solution of amylose in an acidic coagulation solution. However, since the process requires washing with water, and the utilization of water-soluble plasticizers is disadvantageous, the inventors studied the heating film formation process using aqueous amylose solutions. Complete dispersions of aqueous amylose solution with amylose concentrations of 10%-30%, dry solid basis, were found possible with a heat treatment within a temperature range of 120° C.–170° C.

Prolonged heating at temperatures exceeding 170° C. should be avoided, since it causes depolymerization of amylose chains. In case the amylose concentration is within a range of 10%-20%, application of the mixture on the surfaces of glass or metal plates with a doctor blade, and drying of the films thus formed can be carried out easily. Films can be formed with the mixture with a concentration of 10%-20% and a temperature of 70° C.–90° C. by applying the mixture on the surface of a glass plate with a doctor blade and drying the films thus formed for ten minutes. However, the films are extremely brittle and are not suitable for practical uses.

Humectants reported as applicable for the production of amylose films include polyalcohols such as glycerol, di-glycerol and polyglycerol, aminoalcohol, alkyl ammonium chloride and polyvinyl alcohol. However, among them polyalcohols are most generally used. Glycerol is a representative polyalcohol, however, in case the amount of addition is too small the films formed will become brittle whereas an excessive amount will cause a formation of films which possess no gloss and a viscosious tendency due to the deposition of the humectants on the surfaces of the films. On the contrary, sorbitol renders to the films flexibility which is not necessarily desirable. The humectants described above are sensitive to humidity and highly hygroscopic, and thus possess many problems for practical applications when used as humectant.

A compound selected from a group comprising polyalcohols, such as glycerol, diglycerol, sorbitol, maltitol, choline chloride, tetraethylammonium chloride, N-methylethanolamine, monoethanolamine, tri-ethanolamine and polyvinylalcohol, alcoholamine, and etc., was added to amylose in a mixing ratio of 50:100. Comparison tests on the films formed with the mixtures resulted in the findings that the compounds are suitable for the formation of amylose films.

The transparencies of films prepared with amylose, which was fractionated from natural starch, or with amylomaize starch are low, even films with a thickness of 0.05–0.1 mm. were found undesirable displaying light transparencies of only 50%–60%. On the other hand the films prepared with said amylose AL and amylose AME displayed light transparencies of 90%–95% and 80%–90%, respectively. The light transparency difference caused by the variety of plasticizer employed was relatively small. Maltitol is a polyalcohol similar to sorbitol and glycerol and from preliminary tests maltitol was found as a desirable plasticizer for the formation of amylose films.

Since maltitol is a liquid substance obtained by the hydrogenation of a disaccharide, maltose, maltitol is an entirely stables polyalcohol in the view of chemistry. The molecular weight of maltitol corresponds to about four times and about twice as those of glycerol and sorbitol, respectively. Maltitol reaches, a higher viscosity than those of the two latter substances, however, its boiling point is higher and it is entirely non-volatile. On the other hand since maltitol is quite different from sorbitol in the view that it is non-crystallizable, an addition of maltitol of over 50% against amylose does not effect crystallization and moreover films prepared with a mixture of amylose and maltitol does not effect turbidity on the films as observed in the case when sorbitol is used as plasticizer. The facts that maltitol possesses a high boiling point and that a vapor pressure of nearly zero is required for the formation of amylose films are attributes of maltitol being a stable composition and an effective plasticizer. Said maltitol is produced by a process comprising gelatination of a starch slurry at over 120° C., hydrolyzing the gelatinized starch in the presence of β-amylase in the coexistence of isoamylase and pullulanase to produce a maltose syrup with a maltose content of 50%–95%, hydrogenating the syrup in the presence of a Ni-catalyser to a sugar-alcohol mixture and then purifying and concentrating the resultant.

Another problem involving amylose films is the sensibilities of amylose films towards atmospheric humidity, i.e. the humidity sensibilities which cause changes in film strengths. The equilibrated moisure contents of maltitol vary at lower than R.H. 70% in the range of 10%–18%, whereas the range of sorbitol is 3%–25% and that of glycerol is 10%–33%. Obviously maltitol is less sensitive than sorbitol or glycerol, which means maltitol possesses a higher humidity-stability. In case maltitol is added to amylose as a plasticizer, maltitol becomes stabler by the formation of hydrogen bonds between the hydroxyl groups present in both amylose and maltitol. Therefore the films prepared with an amylose mixture, in which maltitol is incorporated as a plasticizer, are hardly affected by atmospheric humidity.

Since the industrial production of maltitol, which possesses as a plasticizer more superior properties than sorbitol and glycerol do, was extremely difficult, publication of a processes for the production of maltitol, which is applicable in the view of industrialization, is not in patents or scientific reports.

In the present invention 30–60 parts of sugar alcohol, which contains over 50% of maltitol, is admixed with 60 parts of amylose, and films are formed with the mixture. Comparison tests on the tensile strength and ultimate elongation of the films showed that the films displayed considerably favorable values at 25° C. and R.H. 50%, and thus the superiority of maltitol over conventional plasticizers, such as sorbitol and glycerol, was established.

The changes of properties with the elapse of time, which has also been a problem involving amylose films were determined. After an elapse of one to four weeks changes in the tensile strength, ultimate elongation, transparency and flexibility were hardly noticed. More particularly the amylose films prepared in accordance with the invention maintained their original flexibilities even after four weeks whereas the films formed with a mixture of amylose and glycerol became brittle, and moreover, since the former films did not display hygroscopicities, the films were found durable for prolonged applications. A tendency in the improvement of film flexibility and strength was observed when a maltitol with a maltitol content of 50% and a large content of oligosaccharide sugar alcohol was used as a plasticizer of the films.

Furthermore, films were formed with amylose mixture, maltitol and plasticizer selected from a group comprising glycerol, sorbitol, soluble polyvinyl alcohol, 1-, 2- and 3-hexantriol, chloine chloride, ethyleneglycol, tetraethyl ammonium chloride, in a mixing ratio of maltitol to the plasticizer 1:2–2:1. Desirable films with high elasticity and tenacity, and in which the characteristics of maltitol were fully displayed, were obtainable.

Said plasticizers can be added 30%–150% against amylose, however, usually an addition of 40%–60% seems preferable. That is, in case the addition amount is less than 30% the strengths of the films formed with the mixture can be improved, however, the films become brittle. Whereas in case the addition amount exceeds 60%, the elongation strengths of films can be improved, however, on the other hand the films lose their strengths and thus many properties which are undesirable for films become evident.

As described above, maltitol and plasticizers which contain maltitol are preferable for the production of amylose films in the present invention. However, glycerol or maltitol increases the tensile strength of the films and a higher elongation increase is attainable with maltitol than glycerol. Thus, in some cases a mixture of maltitol and sorbitol provides more desirable results in the view of tensile strength and elongation.

The invention is further illustrated by the following examples, in which films are formed using a starch hydrolyzate, which is obtained by hydrolyzing a starch containing a long-chain amylose content of over 50% with the action of an alpha-1,6-glucosidase as described in detail above, as starting material, and adding to the hydrolyzate a plasticizer, of which maltitol is its main component. This mixture can be employed for the formation of edible films or edible coatings, and the films or coatings possess high tenacities, desirable transparencies, and low oxygen permeabilities. In the example all units of quantity are by weight unless otherwise indicated.

EXAMPLE I

Ten parts of amylose (AL), dry substance, and 5 parts of a variety of maltitol selected from a group comprising Maltitol 90 (maltitol purity 90%), Maltitol 70 (maltitol purity 70%) and Maltitol 50 (maltitol purity 50%) was incorporated with 90 parts of water. The mixture was dissolved at 150° C. with heating and agitation and then spread with a doctor blade on a surface of a glass plate kept at 80° C. After 8 minutes of drying at 90° C., the thus obtained films was kept under 25° C. and 50% humidity conditions. The elongation and tensile strengths of the films thus produced and in which maltitol of the amounts of 0.35, 0.5 and 0.6 parts per part of amylose, dry substance, were used, were determined after one week and four week storages, the results of which are listed in Table I.

TABLE I.—Results of Comparison Test on the Strengths of Amylose Films Incorporated with Various Plasticizers

| Plasticizers | 0.35/amylose | | 0.5/amylose | | 0.6/amylose | |
|---|---|---|---|---|---|---|
|  | S | E | S | E | S | E |
| Maltitol 90 | 400 (450) | 16 (15) | 350 (345) | 34 (29) | 250 (260) | 50 (45) |
| Maltitol 70 | 480 (470) | 21 (20) | 360 (365) | 22 (20) | 260 (280) | 32 (29) |
| Maltitol 50 | 490 (440) | 14 (13) | 405 (410) | 18 (15) | 245 (255) | 30 (28) |
| Glycerol | 300 (361) | 22 (12) | 280 (335) | 25 (20) | 200 (250) | 31 (25) |
| Diglycerol | 300 (390) | 35 (24) | 290 (350) | 37 (25) | 210 (280) | 45 (35) |
| Sorbitol | 380 (450) | 23 (11) | 340 (390) | 29 (20) | 230 (280) | 36 (24) |
| 1,2,6 hexatriol | 280 (325) | 32 (20) | 250 (280) | 30 (22) | 200 (280) | 41 (28) |

NOTE.—Figures parenthesized are values obtained from determinations after a five week storage; tensile strengths and ultimate elongation are abbreviated "S" and "E" respectively—S = strength, kg./cm.², E = elongation, percent.

EXAMPLE II

In this example amylose AL ten parts, dry substance, and water 100 parts containing five parts of a plasticizer mixture of Maltitol 90 and another variety of plasticizer in the ratio of 1:0.5, 1:1 and 0.5:1, respectively and calculated on dry substance basis were mixed. The preparations were dissolved by autoclave at 155° C. and agitation, cooled to 80° C., applied on the surfaces of glass plates with a doctor blade in a room kept at 90° C., and then dried with warm air over 80° C. for five minutes. The thus obtained films were found excellent possessing fine gloss and improved transparencies. The figures indicated in Table II are values obtained by the determinations of physical properties on films kept at 25° C., 50% R.H. for over one month.

TABLE II

| Blending plasticizer | Mixing ratio | | | | | |
|---|---|---|---|---|---|---|
|  | 1:0.5 | | 1:1 | | 0.5:1 | |
|  | S | E | S | E | S | E |
| Maltitol 90: sorbitol | 470 | 34 | 460 | 35 | 450 | 34 |
| Maltitol 90: glycerol | 300 | 41 | 310 | 32 | 330 | 32 |
| Maltitol 90: hexantriol | 450 | 19 | 420 | 22 | 401 | 21 |
| Maltitol 90: vinylalcohol |  |  |  |  |  |  |
| Maltitol 90: ethylenglycol | 510 | 35 | 520 | 36 | 380 | 40 |
| Maltitol 90: tetramethyl ammonium chloride | 380 | 31 | 240 | 32 | 241 | 32 |

NOTE.—S=Strength, kg./cm.²; E=Elongation, percent.

EXAMPLE III

Ten parts of amylose (AL), D.S., and 90 parts of water, which contained five parts of a mixture of Maltitol 50 and another plasticizer in various mixing ratios, D.S., were prepared. The preparations were dissolved completely similarly as described in Example II to produce an amylose solution. The solution was applied on the surface of glass plates with a doctor blade and the films were stripped from the plates which were kept at 25° C. and R.H. 50% for one month whereupon their physical properties were determined. The results are listed in Table III.

TABLE III

| Plasticizer | Composition | | | | | |
|---|---|---|---|---|---|---|
|  | 1:0.5 | | 1:1 | | 0.5:1 | |
|  | S | E | S | E | S | E |
| Maltitol 50: sorbitol | 400 | 30 | 380 | 43 | 350 | 41 |
| Maltitol 50: glycerol | 350 | 42 | 340 | 45 | 330 | 30 |
| Maltitol 50: hexantriol | 430 | 20 | 420 | 22 | 400 | 20 |
| Maltitol 50: polyvinylalcohol |  |  |  |  |  |  |
| Maltitol 50: ethylenglycol | 500 | 35 | 530 | 36 | 390 | 4 |

NOTE.—Tensile strengths and ultimate elongation are abbreviated "S" and "E" respectively. S=Strength, kg./cm.²; E=Elongation, percent.

As the results listed in the table show, maltitol used as plasticizer renders to the films elasticity, and forms glossy surfaces on the films. Moreover, the elongation degree of the films are of most stable values and the changes due to prolonged storages are less noticeable. That is, in the cases when glycerol, sorbitol, etc., are used as a plasticizer, the elongation degree of the films decrease with the prolongation of storage period, while the tensile strengths of the films increase. However, the films become brittle and lose their folding endurance. The results may be conceived as the contributions of the employment of maltitol for a plasticizer. The stable plasticities are exhibited at each percentages.

EXAMPLE IV

An amylomaize starch suspension (amylose content 70%, D.S.) with a concentration of 15% was gelatinized by heating to 165° C. with agitation for ten minutes, and then cooled rapidly to 60° C. Thereafter, purified enzyme derived from Pseudomonas was added to the gelatinized solution and it was incubated at 45° C. for two days. Thus long-chain-amylose and short-chain amylose were obtained. The amylose mixture was then cooled and precipitated. Ten parts of the precipitation portion, dry substance, was collected and five parts of plasticizer was added to give an amylose concentration of 15%. Thereafter the mixture was dispersed by heating to 130° C. and films were formed with the mixture as described in Example I. After keeping the films at 25° C. and R.H. 50% the properties of the films were determined, the results of which are listed in Table IV.

TABLE IV

| Plasticizer | Thickness | Busting strength, percent | Tensile strength, kg./cm.² | Rigidity |
|---|---|---|---|---|
| Glycerol | 0.05 | 15 | 500 | Strong. |
| Maltitol 90 | 0.05 | 35 | 300 | Weak. |
| Sorbitol | 0.05 | 25 | 350 | Do. |

What we claim:

1. In a process for the production of amylose films comprising hydrolyzing a gelatinized solution of amylomaize starch or ordinary starch with the action of $\alpha$-1,6-glucosidase, precipitating by cooling the reaction mixture until a precipitate consisting solely of linear-chain amylose is formed having a content of greater than 50% of long-chain amylose with a polymerization degree of over 50, recovering the formed precipitate, adding a plasticizer thereto and forming amylose films therewith, the improvement comprising a plasticizer which produces transparent, stable and strong films wherein said plasticizer comprises:

a member of the group consisting of a hydrogenation product of oligosaccharides having a maltitol content of at least 50% and a mixture of said hydrogenation product with another plasticizer suitable for plasticizing amylose films.

2. A process according to claim 1 wherein said starch is amylomaize starch in which an amylose content of over 50% is present.

3. A process according to claim 1 wherein said starch is an ordinary starch.

4. A process according to claim 1 wherein said plasticizer comprises a mixture of said hydrogenation product containing at least 50% maltitol and another plasticizer selected from a group consisting of sorbitol, glycerol, ethyleneglycol, hexantriol, and polyvinylalcohol.

5. A process in accordance with claim 1 wherein said plasticizer is added to the amylose in the amount of over 30% against the amylose.

6. A process in accordance with claim 1 wherein said film-forming step comprises dispersing said amylose solution with a concentration of 10–30% dry basis, by heating to 120° C.–170° C., forming a film therewith and drying said film with hot air of 70°–90° C.

7. A process in accordance with claim 4 wherein the mixing ratio of maltitol to said other plasticizer is in the range of 1:2–2:1.

8. A process in accordance with claim 1 wherein said plasticizer is added in an amount of 40–60% against said amylose.

References Cited

UNITED STATES PATENTS

| 2,822,581 | 2/1958 | Muetgeert | 106—210 |
| 3,560,345 | 2/1971 | Yokobayashi | 195—66 |
| 3,243,308 | 3/1966 | Barger | 106—213 |

FOREIGN PATENTS

| 806,236 | 1/1959 | United Kingdom. |

THEODORE MORRIS, Primary Examiner

U.S. Cl. X.R.

106—213